United States Patent [19]

Levington et al.

[11] 4,174,016
[45] Nov. 13, 1979

[54] HYDRAULIC CAB TILTING SYSTEMS

[75] Inventors: Henry J. Levington; James G. Knowles, both of Lincoln, England

[73] Assignee: Clayton Dewandre Company Limited, Lincoln, England

[21] Appl. No.: 786,541

[22] Filed: Apr. 11, 1977

[30] Foreign Application Priority Data

May 3, 1976 [GB] United Kingdom ............... 17934/76

[51] Int. Cl.² ............................................. B62D 33/06
[52] U.S. Cl. ................................ 180/89.15; 180/89.16; 296/35 R
[58] Field of Search .................... 296/28 C, 35 R; 180/89.13, 89.14, 89.15; 91/45; 60/400; 417/401

[56] References Cited

U.S. PATENT DOCUMENTS

| | | | |
|---|---|---|---|
| 3,581,840 | 6/1971 | Hirst, Jr. | 180/89.14 |
| 3,985,194 | 10/1976 | Knutson | 296/35 R |
| 4,085,960 | 4/1978 | McDermid | 296/35 R |

*Primary Examiner*—Richard A. Bertsch
*Attorney, Agent, or Firm*—Norris & Bateman

[57] ABSTRACT

A hydraulic ram system for tilting a vehicle cab which is resiliently mounted on the vehicle frame includes a ram cylinder of which that end in which the ram piston is located when the cab is in the lowered position is of increased bore diameter to render the piston passive in this position, a restriction being provided in the lower ram line across which a pressure drop is created when fluid is pumped through the line, while in the upper ram line a valve is provided responsive to the pressure differential across the restriction and thereby operable to interconnect the upper and lower ram lines.

8 Claims, 8 Drawing Figures

HYDRAULIC CAB TILTING SYSTEMS

The cabs of large commercial vehicles are often resiliently supported on the vehicle chassis and in addition are so mounted that they can be tilted forward by a hydraulic ram or jack to provide access to the engine and other mechanism. However, when the cab is in the lowered position the ram tends to act undesirably as a damper under the movements of the cab on its suspension, and where the ram is fitted with lock valves the cab could become positively locked to the chassis. In the specification of our prior U.S. Pat. No. 3,972,557, we have disclosed a manner of overcoming this problem by forming that end of the ram cylinder in which the piston is located when the cab is in its lowered position of increased bore diameter to provide a clearance around the ram piston sufficient to render the ram passive in this position, that is, the piston is free to 'float' and presents no resistance to the movements of the cab on its resilient suspension.

With such a system it is necessary in the 'float' condition to connect to the reservoir either one or both of the hydraulic lines between the hand pump of the hydraulic system and the ram to allow fluid to be drawn into and out of the ram cylinder. Also in order to raise the cab the ram piston must first be pumped out of the float zone and this can be achieved in either of two ways, namely, by connecting both lines from the ram to the pumping chamber so that pressure acts on the piston rod area only, the rod area being such that the net force on the piston rod exceeds the cab load, and which connection can be used to pump the rod fully out, i.e. through the float zone and the normal operating zone, or alternatively by connecting the lower ram line to the pump chamber and blocking the upper ram line. This connection can be used to pump the ram out of the float zone only and when the ram piston seal engages with the cylinder bore, the upper ram line must be connected to the reservoir to continue normal cab raise, all as described in our aforementioned Spec. U.S. Pat. No. 3,972,557. The pump directional control valve could be adapted to perform either of these functions, but in the first method the possibility exists of the valve being left in the 'raise' position whilst the ram piston is in the float zone, resulting in partially locking the ram; and in the second method a three-position valve is necessary and the operator has to be instructed in the sequence and timing of the valve operation. It is the object of the present invention to provide an improved and more satisfactory manner of performing the said functions without the risk of operator error and according to the invention this result is achieved by providing a restricted orifice in the lower ram line such that when fluid is pumped through said line to raise the load a pressure drop is created across the restriction, and by providing in the upper ram line valve means responsive to the pressure differential across the restriction in the lower ram line and operable thereby to connect the upper ram line to the lower ram line.

Reference will now be made to the accompanying drawings which illustrate several embodiments of the invention and wherein.

Figure 1:
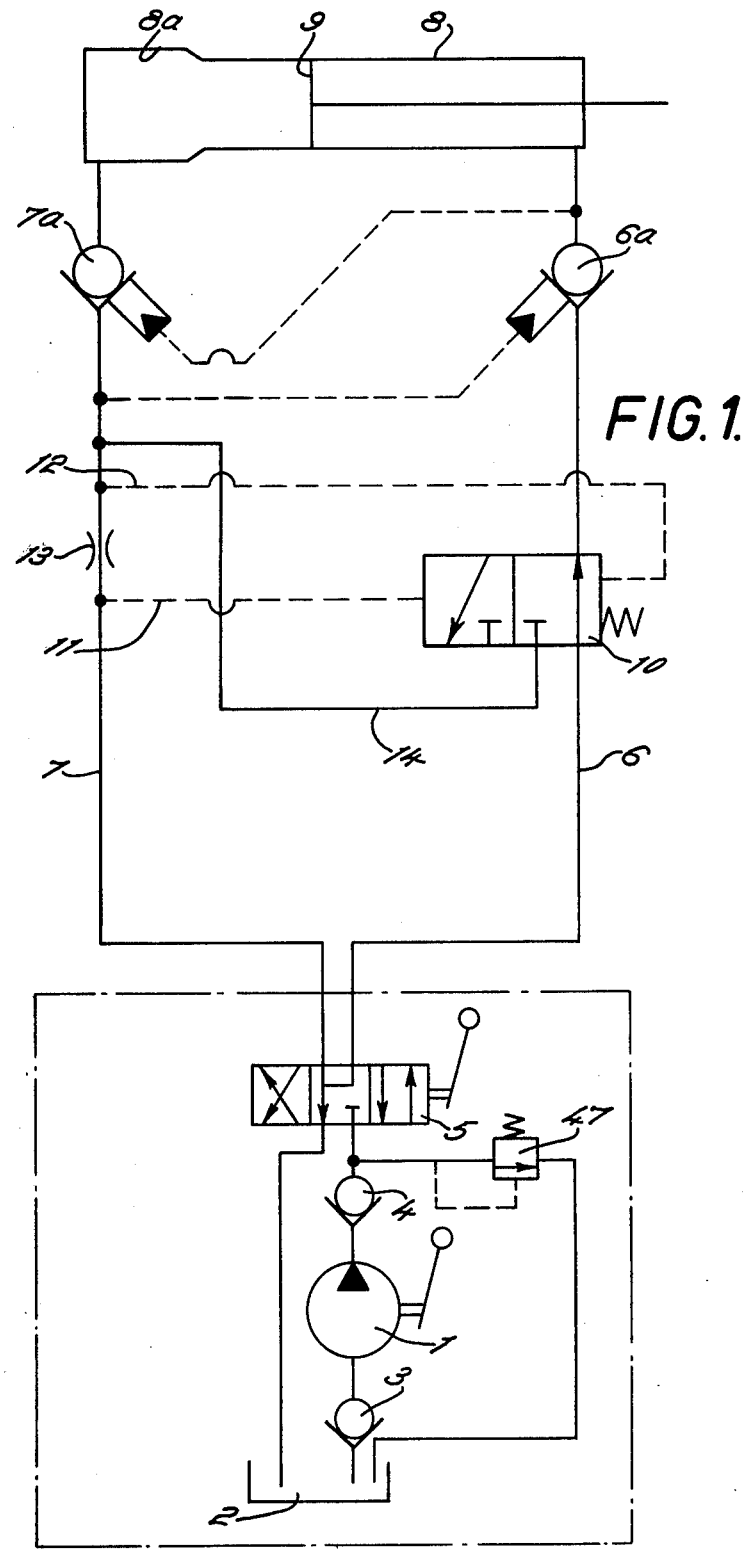
FIG. 1 is a circuit diagram of a first embodiment of the improved hydraulic ram system.
Figure 2:
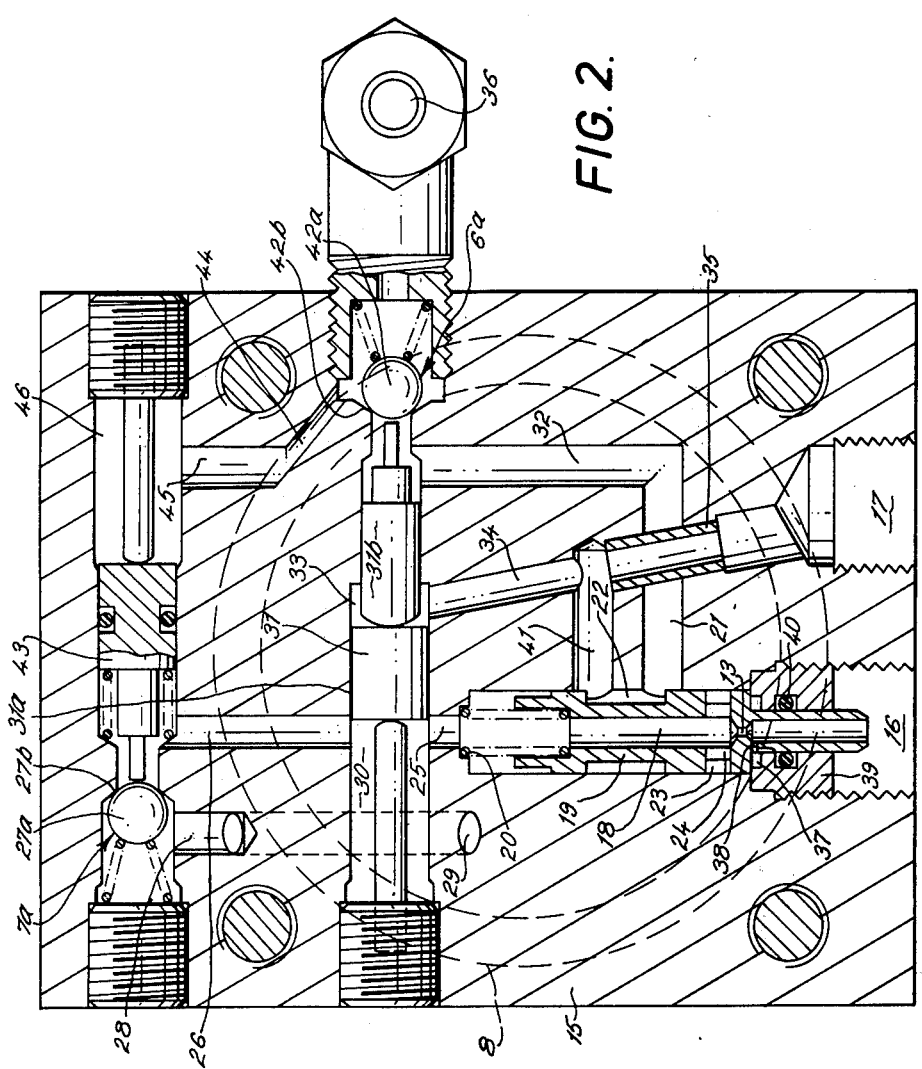
FIG. 2 is a cross sectional view of part of the lower end of a cab tilt ram incorporating two lock valves and a three-way valve interconnected in accordance with the circuit of FIG. 1.
Figure 5:
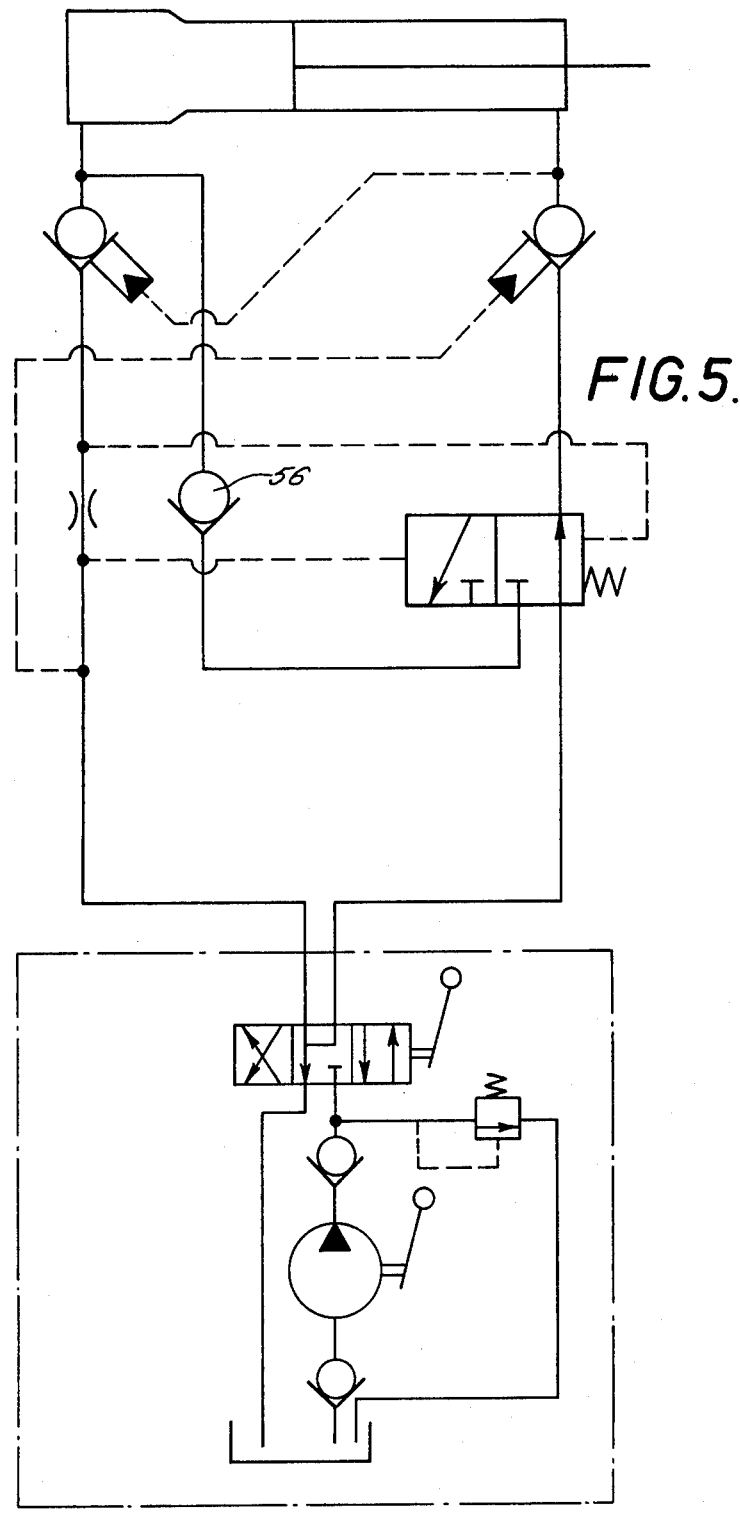
Figure 6:
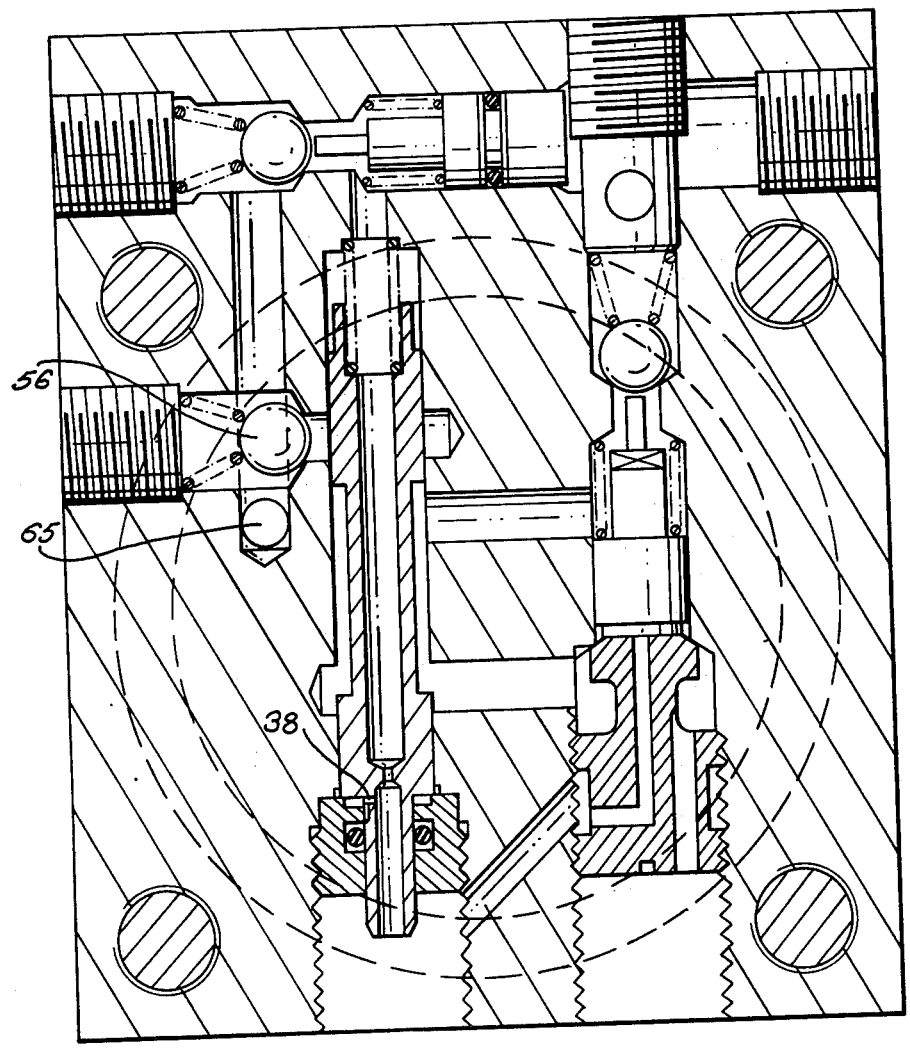
Figure 7:
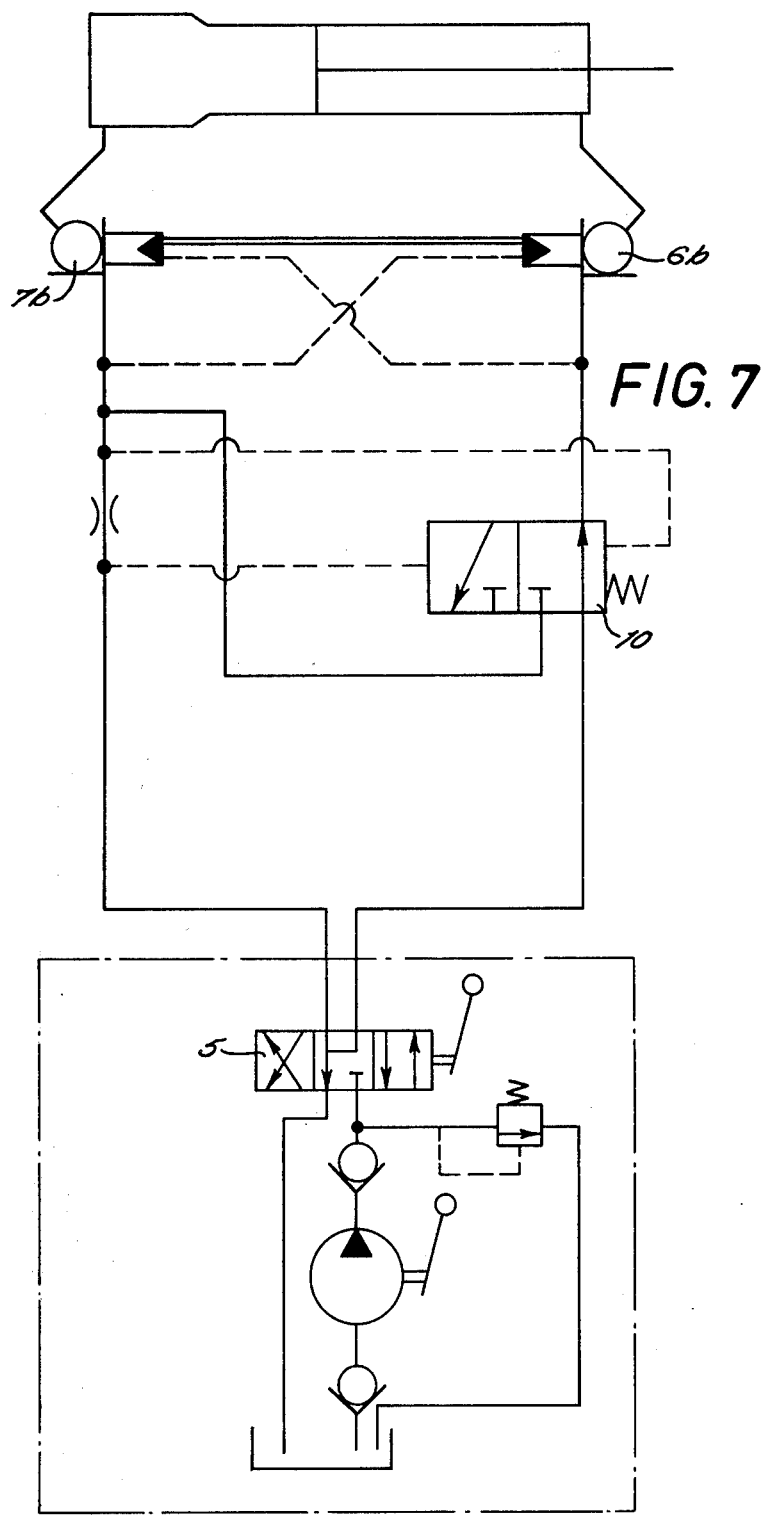
Figure 8:
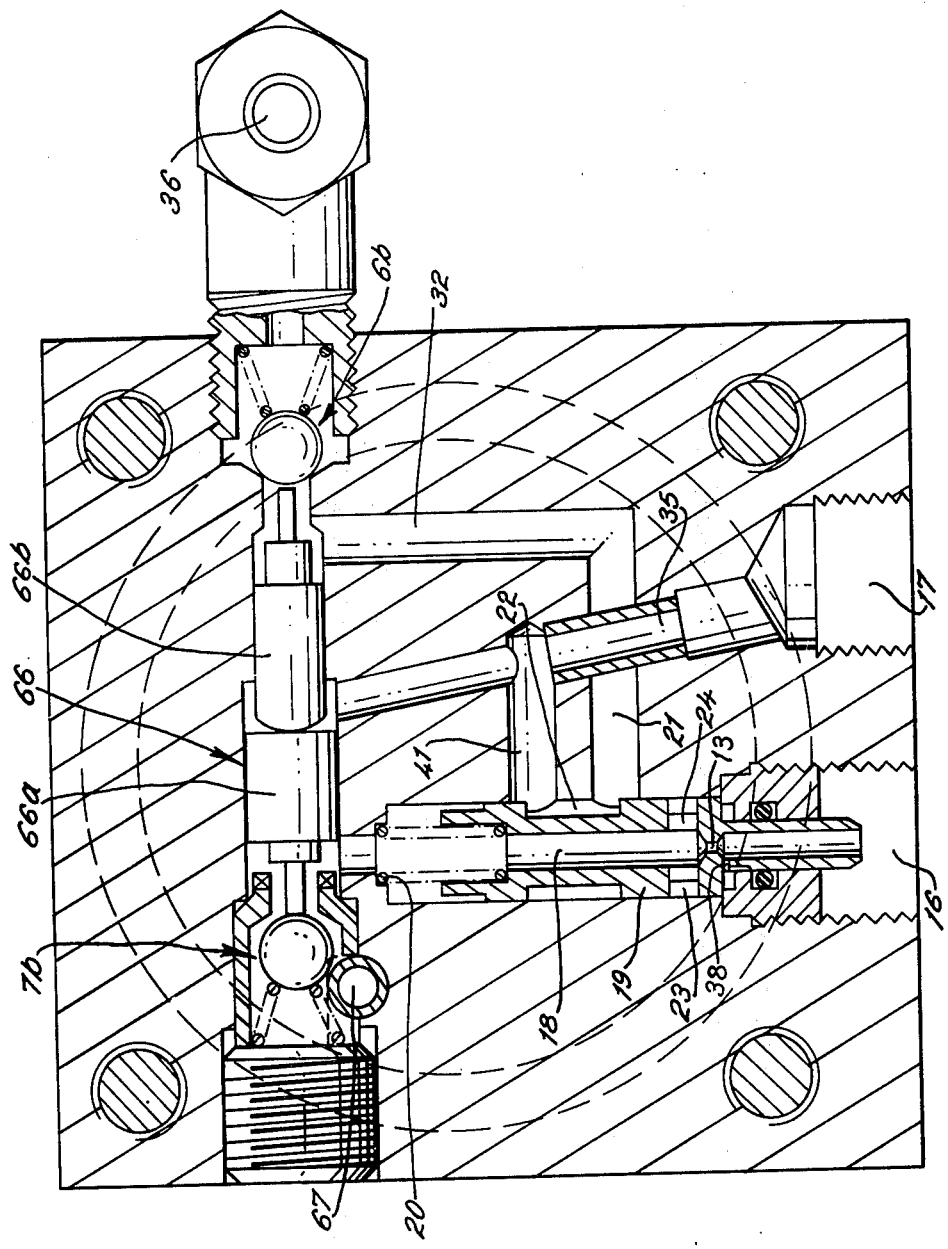

FIGS. 5 and 6 are views corresponding to FIGS. 1 and 2 respectively but of a further embodiment; and FIGS. 7 and 8 are views corresponding to FIGS. 1 and 2 respectively but of a still further embodiment.

Referring first to FIG. 1, there is shown a hand pump 1 receiving fluid from a reservoir 2 via a non-return valve 3 and delivering it via a further non-return valve 4 to a hand-actuated control valve 5 which directs the fluid selectively to the lines 6, 7 connected respectively to the upper and lower ends of the ram 8, said ram including a lower end portion 8a of increased bore diameter providing a clearance around the piston 9 when it is in that portion. Lock valves 6a, 7a are provided respectively in the lines 6, 7 and are each operable by the pressure in the opposite line. Interposed in the line 6 is a three-way two-position valve 10 spring-loaded to the closed position shown, pilot lines 11, 12 connecting the lower ram line 7 at each side of a restriction 13 in the line to the actuating means of valve 10 such that when fluid is being pumped through line 7 to the lower end of the cylinder 8 a pressure drop is established across the restriction and which opens the valve 10 to connect the section of line 6 at the upper end of the cylinder to the lower ram line 7 via a line 14 thus permitting the cab to be raised, utilising the piston rod area only, throughout both the float zone and the normal operating zone. When pumping ceases the pressure drop across the restriction 13 falls to zero allowing the valve 10 to return to its normal operating position, under the action of its spring load.

When fluid is pumped into the upper end of the ram to lower the cab, the valve 10 remains in its normal operating position and fluid from the lower end of the ram flows through the restriction 13 back to the reservoir. This creats a pressure drop across the restriction, in the reverse direction to that created when raising the cab, which assists the spring loading on the valve 10.

With the ram piston 9 in the float zone 8a, inward movement of the piston rod produces a pressure in both the upper and lower ends of the ram sufficient to release the lock valves 6a, 7a. The lock valves are connected such that the unlocking piston of the lower end lock valve 7a is actuated by the pressure in the upper end of the ram, and is therefore released by the said pressure. Fluid can then return to the reservoir through the lower end lock valve. If the control valve 5 is set to 'raise', a pressure build up occurs in the lower end ram line 7, and the upper end lock valve 6a is released allowing fluid to return to the reservoir via the upper end ram line. Fluid cannot therefore be trapped in the ram in any position of the control valve 5 and the ram offers only minimal resistance to movement of the cab on its suspension. During the outward movement of the piston rod, fluid is drawn into the ram from the reservoir, via whichever line is connected to the reservoir, by the control valve 5.

It will be noted that the system will also work if the pilot lines to the lock valves are reversed i.e. if the pressure in the lower end of the ram actuated the unlocking piston in the upper end lock valve, or if both pilot lines are connected on the ram side of the opposing lock valve.

It is desirable that some form of damper, e.g. a rubber or plastic ring or a dashpot and piston, be fitted to the valve 10 in order to prevent a too rapid return to its normal working or closed position. When raising the cab out of the 'float' zone, if the said valve were to return to its normal position between pumping strokes, the lock valves would be released and the cab would fall. However, if, even with a damper, this were to occur due to slow operator pumping, the cab would only fall at the most, a distance equivalent to the length of the float zone and it would not constitute a safety hazard.

Referring now to FIG. 2, there is shown a valve body 15 integral with the lower mounting pivot of the ram and clamped to the ram cylinder 8, shown dotted, with a pressure tight seal, the hydraulic lines 6, 7 from the pump 1 being connected to ports 16 and 17. To raise the cab, fluid is pumped into port 16 and flows through the restriction 13 and through passage 18 of valve spool 19, thus creating a pressure drop across the restriction 13 sufficient to move the spool, against the spring 20, to close passage 21 from the annular spool chamber 22 and to open said passage to annular chamber 23, which is connected to the central spool passage 18 by cross holes 24. Fluid flows through drilled passages 25 and 26 and through the lower end lock valve 7a, lifting ball 27a off its seat 27b, and flows into the lower end of the ram cylinder via passages 28 and 29.

Pump pressure in chamber 30 acts on the end of the upper lock valve unlocking piston 31 in a direction to release the lock valve 6a. Pump pressure in the central spool passage 18 is also transmitted to the other end of the upper lock valve unlocking piston 31, via passages 21 and 32, in a direction opposing the release of lock valve 6a. With an equal area unlocking piston, this would prevent the release of lock valve 6a. The problem is overcome in this embodiment by using a differential area unlocking piston 31, constructed preferably in two parts, 31a and 31b, to avoid possible mis-alignment problems between the bores which house the piston 31. However the unlocking piston 31 could be of a one piece construction if it was economically desirable. To prevent a pressure build up, due to leaking fluid, at the inner end of piston 31a, chamber 33 is connected to port 17 via drilling 34 and crossover tube 35, which is connected to the pump reservoir when raising the cab. Hence the upper lock valve 6a is released, due to the action of pump pressure on the unlocking piston 31, and displaced fluid flows from the upper end of the ram via an external pipe 36, through lock valve 6a and drilled passages 32 and 21, into the central spool passage 18 via annular spool chamber 23 and cross holes 24. Here the displaced fluid from the upper end of the ram combines with the pumped fluid from the hand pump and enters the lower end of the ram as previously described. The cab is therefore raised by pressurising the ram piston rod area only and the cab can be pumped up out of the float zone and into its normal operating zone. On cessation of pumping, the pressure in the lower pump line leaks away, and the lock valves close under the action of their respecrive springs. Also the three-way valve spool 19 returns to its normal operating position under the action of spring 20, but the rate at which it returns is slowed down by the inclusion of a damping chamber 37 and a damping orifice 38 in the spool. The damping chamber 37 is confined by the screwed plug 39 and the sealing ring 40 and as the spool returns flow out of the chamber 37 is restricted by the orifice 38.

To lower the cab, fluid is pumped into port 17 through the cross-over tube 35 into passage 41, around the annular spool chamber 22 and out through passages 21 and 32, through the upper end lock valve 6a, lifting the ball 42a off its seat 42b, and along the external pipe 36 to the upper end of the ram. Upper end pressure inside lock valve 6a is fed to the unlocking piston 43 of lower lock valve 7a via passages 44, 45, and 46. This releases lock valve 7a and displaced fluid from the lower end of the ram returns to the reservoir of the hand pump via passages 26 and 25, spool central passage 18, orifice 13 and port 16.

With the cab resting on its suspension and the ram in the float zone, inward movement of the piston rod pressurises both the upper and the lower end of the ram, and also the unlocking piston 43 of the lower end lock valve 6a, via passages 44, 45 and 46. Hence the lower end lock valve 6a is released and fluid can escape via port 16 to the hand pump reservoir, provided the control valve in the hand pump is set to 'lower'. If it is set to 'raise', then the lower end ram line is pressurized, together with the unlocking piston 31 of the upper end lock valve 6a and the said lock valve is released allowing fluid to escape to the reservoir via port 17 and the upper ram line. During outward movement of the piston rod, fluid is drawn into the ram via whichever line is connected to the reservoir by the control valve.

The system may include a relief valve 47 connected to the output side of the pump, See FIG. 1, said valve being set to a relatively high relief pressure but protecting the system against over-pressure.

Referring to the circuit in FIG. 1, with the valve 10 connecting the upper ram line 6 to the lower ram line via line 14, when pumping fluid across the restriction 13 to raise the cab, the pump pressure is fed to both sides of the unlocking piston in the upper lock valve 6a. Under such conditions and with an unlocking piston having opposite faces of equal area, the valve will not open. However in FIG. 3, the pilot connection 48 to the unlocking piston in the upper ram line is positioned upstream of the restriction 13 so as to receive the higher pump pressure at this point. Also a check valve 49 is installed in the connecting line 14 between the valve 10 and the lower ram line 7, thereby preventing the initial pumping pressure from acting on the underside of the unlocking piston. Hence a pressure drop across the unlocking piston is created and the valve will open.

An alternative method of opening the lock valve 6a is to use a differential area unlocking piston, so that the pressure on top of the piston, tending to open the valve, acts on a larger area than the pressure on the bottom of the piston.

Figure 3:
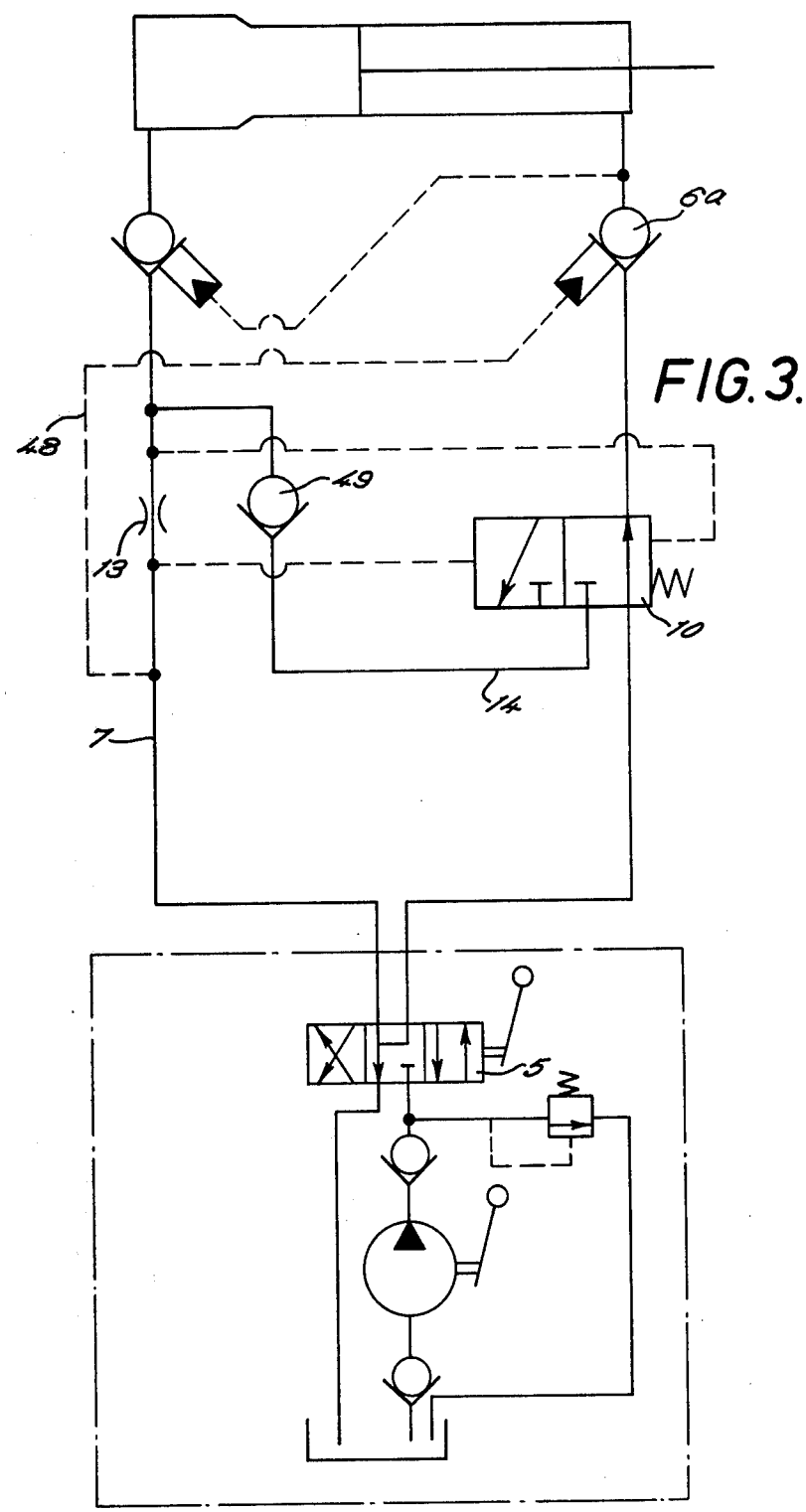
FIGS. 3 and 4 are views corresponding to FIGS. 1 and 2 respectively but of a second embodiment.
Figure 4:
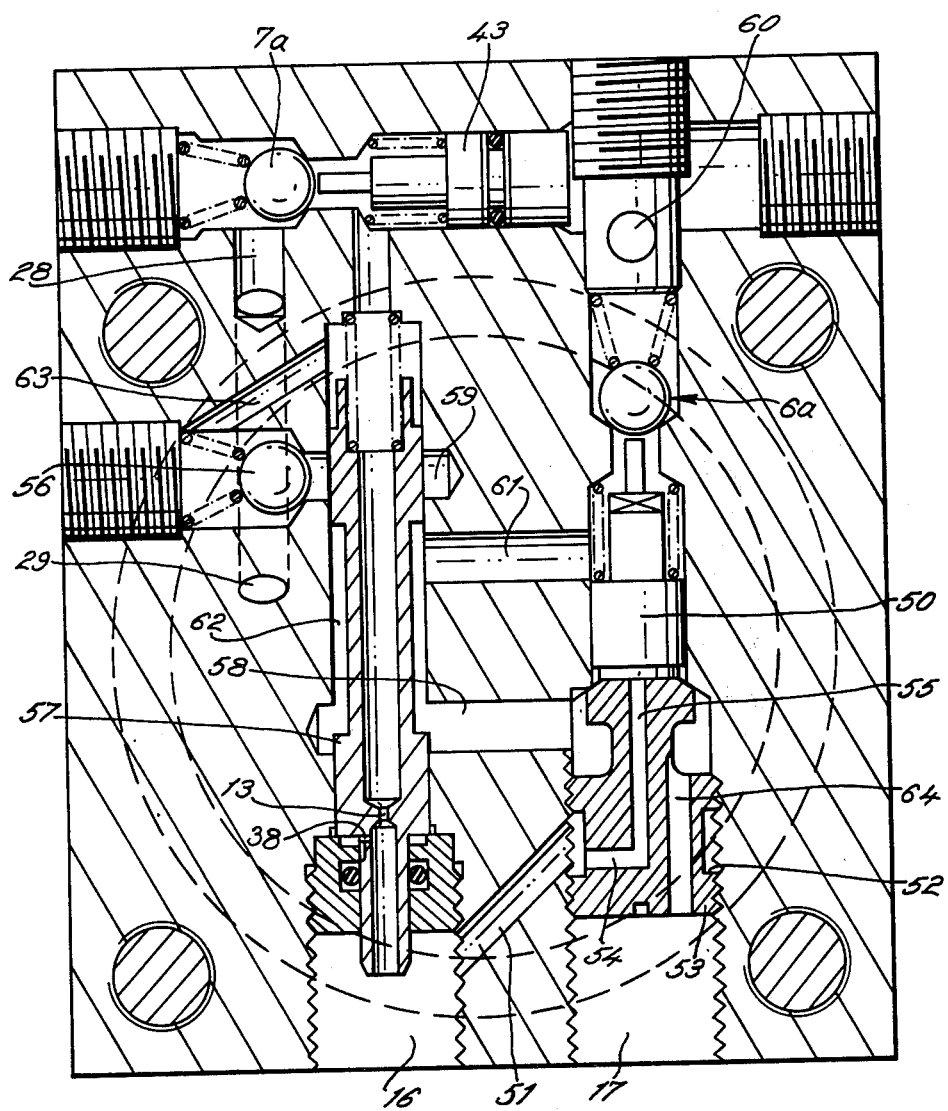

FIG. 4 shows the valve assembly corresponding to the circuit shown in FIG. 3 and utilising an equal area unlocking piston 50 to release the upper lock valve 6a. In order to provide a pressure difference across the piston it is fed with pump pressure from upstream of spool orifice 13 via passages 51, annular groove 52 in sealing plug 53, and passages 54 and 55. Also pump pressure is prevented from acting on the inner face of unlocking piston 50, when the three-way valve is selected by a check valve 56. When lock valve 6a is released and the discharging fluid opens check valve 56, the inner face of the unlocking piston 50 reacts to pressure at a point downstream of spool orifice 13 and hence a pressure drop is maintained across the piston.

The functioning of the valve assembly is similar to that of FIG. 2: To raise the cab, fluid is pumped into port 16 and through the spool 57; the pressure drop across spool orifice 13 moves the spool, closes passage 58 and opens passage 59. Fluid further flows through the lower end lock valve 7a and into the lower end of the cylinder via passages 28 and 29. The upper end lock valve is released, as previously described, and fluid from the upper end of the ram flows via an external pipe to enter the valve block at drilling 60 and flows through lock valve 6a, along passage 61, around annular spool chamber 62 to passage 59, through check valve 56 and out along passage 63. Here it combines with the pumped flow and enters the lower end of the ram via the lower end lock valve 7a.

To lower the cab, with the three-way valve spool 57 having returned to its normal released condition, fluid is pumped into port 17, through a passage 64 in sealing plug 53 and through the upper end of lock valve 6a via passage 58, annular spool chamber 62 and passage 61. Fluid then flows out through drilling 60 and along an external pipe to the upper end of the ram. The lower end lock valve 7a is released by pressure in the upper end of the ram acting on the unlocking piston 43 and displaced fluid passes through lock valve 7a and returns through the hole in spool 57 to the reservoir of the hand pump.

With the ram piston in the float zone, both ends of the ram are pressurised by inward movement of the piston rod and the lower end lock valve 7a is released by pressure in the upper end acting on the unlocking piston 43. Depending on the position of the control valve 5, fluid either returns to the reservoir through the spool 57 and port 16 or, if the lower ram line is blocked, pressure releases the upper end lock valve 6a by acting on unlocking piston 50 via passages 51, 52, 54 and 55. Fluid then escapes through the upper end lock valve 6a and port 17 to the reservoir.

As a manufacturing convenience the circuit diagram, FIG. 3, of valve block, FIG. 4 could be modified by connecting the downstream side of check valve 56 directly into the lower end of the ram as in FIG. 5. This replaces the diagonal drillings 63 and 29 of FIG. 4 by the less expensive drilling 65 in the modified valve block in FIG. 6. However in this position the valve is subjected to the pressure in the lower end of the ram and must therefore be absolutely leak proof to lock the cab in position when raised.

A further alternative is shown diagrammatically in FIG. 7 and in detail in FIG. 8. This employs the three-way valve 10 and a differential area unlocking piston, for the upper lock valve, in a similar manner to the valve block in FIG. 4. However the need to have the lower end lock valve released by a separate, leakage free, unlocking piston, actuated by upper ram end pressure, is eliminated by mounting the two lock valves 6b, 7b in opposing fashion with a single differential area piston assembly 66 between them, and by making the piston sufficiently long that one of the valves is always open. This mechanically provides the same function as connecting the hydraulic pilot line of each lock valve on the ram side of the other lock valve, i.e. with the ram in its normal operating zone, the closed valve is always the valve under pressure and supporting the cab. The differential area piston then acts as an equal area piston when releasing the lower end lock valve.

Functioning of the valve in detail is as follows. To raise the cab, fluid is pumped into port 16, through the spool 19, across orifice 13 and out through central spool passage 18. The pressure drop created across orifice 13, sets the spool against the load imposed by the spring 20, closing off passage 21 from the annular spool chamber 22 and opening the passage 21 to the annular spool chamber 23 and the central spool passage 18 via cross holes 24. Fluid then flows through the lower end lock valve 7b and out through tube 67 into the lower end of the ram. The upper end lock valve 6b is released by the action of pump pressure on the piston 66a of the unlocking piston assembly 66 and displaced fluid from the upper end of the ram flows along the external pipe 36 and through the upper end lock valve 6b. It then combines with the pumped flow in the central spool passage 18 via passages 32, 21 and 23 and flows into the lower end of the ram.

To lower the cab, fluid is pumped into port 17, through the cross-over tube 35, around spool 19 via passage 41, annular spool chamber 22 and passage 21; along passage 32, through upper end lock valve 6b and into the upper end of the ram via the external pipe 36. Pump pressure acts on the end face of unlocking piston 66a and at both ends of associated piston 66b, to release the lower end lock valve 7b. Displaced fluid from the lower end of the ram then flows out of tube 67, through the lower end lock valve 7b, down through spool 19 and out of port 16 to return to the reservoir of the hand pump.

With the cab resting on its suspension and the ram piston in the float zone, inward movement of the piston rod pressurises both ends of the ram. If the upper ram line is blocked and the lower ram line is connected to reservoir, by the control valve in the hand pump being set to "lower", a pressure difference will exist across the lower end lock valve 7b with the tendency for it to close. But as said lock valve closes the upper end lock valve 6b is pushed open by the differential area unlocking piston assembly 66, causing immediate pressurisation of the blocked upper ram line. This pressure will act on the unlocking piston assembly 66 and hold the lower lock valve 7b open, allowing fluid to escape to the reservoir via port 16. If the control valve 5 is set to raise, the lower ram line is blocked and the upper ram line is connected to the reservoir, then pressure is built up in the lower ram line and the upper lock valve is released by the pressure acting on the unlocking piston assembly 66. Fluid then escapes via the upper lock valve 6b and port 17 to the reservoir. Therefore in either position of the control valve, pressure cannot be trapped in the ram and the ram will not restrict the movement of the cab. Outward movement of the ram piston rod causes fluid to be drawn out of the reservoir and into the ram through whichever ram line is connected to the reservoir by the control valve.

We claim:

1. In a hydraulic ram system incorporating a cylinder and piston assembly for tilting the cab of a commercial vehicle, which cab is resiliently mounted on the vehicle frame or chassis, wherein the end of the ram cylinder in which the ram piston is located when the cab is in the lowered position is of increased bore diameter to provide enough clearance around the piston to render the ram passive in this position, the length of the increased cylinder bore being sufficient to accommodate the maximum movement of the cab on its suspension, and wherein a lower fluid conducting ram line is connected to the increased bore end of said ram cylinder and an upper fluid conducting ram line is connected to the other end of said ram cylinder; the improvement wherein there is provided in the lower ram line a restriction such that when fluid is pumped through said line to raise the load a pressure drop is created across the restriction, and there is provided in the upper ram line valve means operatively connected to be responsive to the pressure differential across said restriction and operable thereby to connect the upper ram line to the lower ram line.

2. A hydraulic ram system as claimed in claim 1, wherein said valve means consists of two-position valve spring loaded to a closed position, said valve being connected by pilot lines to the lower ram line at each side of said restriction in such manner that when said pressure drop is established the valve is opened against its spring loading to interconnect the two ram lines.

3. A hydraulic ram system as claimed in claim 2, wherein damping means are fitted to the two-position valve to prevent a too rapid return to the closed position.

4. A hydraulic ram system as claimed in claim 1, wherein said pressure responsive valve means when open connects the upper ram line to the lower ram line at a point between said restriction and a lock valve in the lower ram line.

5. A hydraulic ram system as claimed in claim 4, wherein a check valve is inserted in the line between said valve means and the lower ram line.

6. A hydraulic ram system as claimed in claim 1, wherein said pressure responsive valve means when open connects the upper ram line to the lower ram line at a point between a lock valve in the lower ram line and the ram cylinder.

7. A hydraulic ram system as claimed in claim 1, wherein a lock valve in the upper ram line is actuated by an unlocking piston having opposite faces of equal area, a pilot line to said unlocking piston being connected to the lower ram line at a point upstream of the restriction.

8. A hydraulic ram system as claimed in claim 1, wherein a lock valve in the upper ram line is actuated by an unlocking piston having opposite faces of different areas such that pressure on the unlocking piston tending to open the lock valve acts on a larger area than the pressure tending to hold it closed.

* * * * *